United States Patent
Möller et al.

(10) Patent No.: US 8,258,233 B2
(45) Date of Patent: Sep. 4, 2012

(54) AQUEOUS DISPERSION

(75) Inventors: Thomas Möller, Düsseldorf (DE);
Andreas Taden, Düsseldorf (DE); Erik Hattemer, Düsseldorf (DE); Oliver Sommer, Düsseldorf (DE); Ralf Gossen, Duisburg (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 142 days.

(21) Appl. No.: 12/753,986

(22) Filed: Apr. 5, 2010

(65) Prior Publication Data

US 2010/0255301 A1    Oct. 7, 2010

Related U.S. Application Data

(63) Continuation of application No. PCT/EP2008/061405, filed on Aug. 29, 2008.

(30) Foreign Application Priority Data

Oct. 5, 2007 (DE) .......................... 10 2007 048 141

(51) Int. Cl.
*C09J 131/02* (2006.01)
(52) U.S. Cl. .................. 524/564; 524/563; 428/355 AC
(58) Field of Classification Search .................. 524/563, 524/564; 428/355 AC
See application file for complete search history.

(56) References Cited

U.S. PATENT DOCUMENTS

| | | | |
|---|---|---|---|
| 4,070,533 A | 1/1978 | Papantoniou et al. |
| 4,532,295 A | 7/1985 | Brabetz et al. |
| 5,070,164 A | 12/1991 | Min et al. |
| 5,387,641 A | 2/1995 | Yeung et al. |
| 5,441,562 A | 8/1995 | Broich et al. |
| 5,545,684 A | 8/1996 | Jakob et al. |

FOREIGN PATENT DOCUMENTS

| | | |
|---|---|---|
| DE | 4431343 A1 | 3/1996 |
| DE | 19652728 A1 | 6/1997 |
| DE | 19654177 A1 | 6/1998 |
| EP | 1304339 B1 | 5/2005 |

OTHER PUBLICATIONS

N. M. Ranjha, Pakistan Journal of Pharmaceutical Sciences, vol. 12, No. 1, Jan. 1999, pp. 33-41.*
Rinno, Helmut, Poly(Vinyl Esters). Ullmann's Encyyclopedia of Industrial Chemistry. Wiley-VCH Verlag GmbH & Co. KGAa, (2005), 1-11.

* cited by examiner

*Primary Examiner* — David W Wu
*Assistant Examiner* — Vu A Nguyen
(74) *Attorney, Agent, or Firm* — Sun Hee Lehmann

(57) ABSTRACT

The invention provides an adhesive with an aqueous polymer dispersion. The aqueous polymer dispersion comprises a copolymer of a) esters of vinyl alcohol with $C_2$ to $C_6$ monocarboxylic acids, b) α,β-unsaturated $C_3$ to $C_9$ carboxylic acids or vinyl-substituted phosphonic or sulfonic acids, c) polyunsaturated monomers, and optionally d) non-polar, copolymerizable monomers and e) copolymerizable monomers that carry polar functional groups, where the ratio of c:b ranges from 1:10 to 1:400. The adhesive has high adhesion strength, stable viscosity during high-speed automatic application process and, is optionally, remoistenable with water or becomes water-soluble. The adhesive may be advantageous used as wood adhesive, remoistenable adhesive, label adhesive, bottle adhesive, and the like.

15 Claims, No Drawings

AQUEOUS DISPERSION

This application is a continuation of International Application No. PCT/EP2008/061405 filed Aug. 29, 2008 which claims priority to German Patent Application No. 10 2007 048 141.3 filed Oct. 5, 2007, the contents of both of which are incorporated herein by reference.

The invention relates to special synthetic, water-soluble or water-dispersible polymers as well as their use as an adhesive or coating agent.

Aqueous adhesives for gluing paper, cardboard, plastic or wood to various substrates are widespread. Important substrates are hard, non-absorbent glass or plastic surfaces, e.g. as bottles or cans, or also absorbent substrates such as cardboard or wood substrates. With non-absorbent substrates, for the purposes of recycling of the containers, the labels should be able to be removed from the substrate.

From DE 33 23 851, adhesives are known that are based on an aqueous polymer dispersion, manufactured from vinyl esters and additional ethylenically unsaturated compounds in the presence of starch ethers as the protective colloid with special initiator mixtures. These dispersions are used for manufacturing redispersible paste powders. A use of specially selected monomer mixtures as the removable label adhesive has not been described.

Aqueous adhesives for labeling bottles are described in WO 93/3111. They are based on a casein derivative, a colophonium resin, monohydric or polyhydric alcohols and additional auxiliaries. The use of copolymers of hydrophobic and acid group-carrying monomers together was not described.

EP-B 0 686 682 relates to a dispersion adhesive based on polyvinyl esters which as an applied adhesive exhibits an increased resistance to water. For this purpose an aqueous polyvinyl ester dispersion was employed, which comprises a copolymer of vinyl esters, $\alpha,\beta$-unsaturated carboxylic acids and additional $\alpha$-olefin derivatives together with a protective colloid, as well as an aldehyde group-releasing crosslinker. This dispersion is stable at pH 2 to 6.

EP-B 1 304 339 relates to a polyvinyl ester-based dispersion adhesive for wood materials. The polymer dispersion comprises a copolymer based on vinyl acetate, $\alpha,\beta$-unsaturated carboxylic acids, acrylic esters as well as polymerizable monomers that additionally comprise crosslinkable functional groups in the adhesive. Polyvinyl alcohol is added as the dispersion colloid. This adhesive is employed as a wood adhesive, but only polyvinyl ester homopolymers are mentioned for gluing paper.

Because of the presence of emulsifiers and protective colloids in the aqueous dispersion, after adhesion, such adhesives frequently demonstrate only a low resistance towards water. If the adhesive strength is adequate, the later removability during the recycling of packaging is carried out only with difficulty. Permanently crosslinkable adhesives therefore have a poor removability. Acids in the adhesive products often lead to corrosion in the application machinery. For its application the adhesive must have a high solids content and demonstrate an as constant as possible viscosity appropriate to the processing conditions. In addition, the dependence of the viscosity on pH and hence the solubility of the binder should be improved.

Accordingly, the object of the invention is to provide an aqueous polymer dispersion, based on radically polymerizable vinyl ester monomers, and which develops a high adhesion strength even on hydrophobic surfaces, shows a stable viscosity behavior during the application, is optionally remoistenable with water or is water-soluble, but moreover exhibits a suitable viscosity for a high-speed automatic application.

The object is achieved by an aqueous polymer dispersion, wherein the polymer dispersion comprises a copolymer of
a) 80 to 95 wt. % esters of vinyl alcohol with $C_2$ to $C_6$ monocarboxylic acids,
b) 1 to 20 wt. % of $\alpha,\beta$-unsaturated $C_3$ to $C_9$ carboxylic acids or vinyl-substituted phosphonic or sulfonic acids,
c) 0.01 to 5 wt. % of polyunsaturated monomers,
d) 0.0 to 20 wt. % of non-polar, copolymerizable monomers,
e) 0 to 5 wt. % of copolymerizable monomers that carry polar functional groups,
wherein the sum of the monomers should be 100% and wherein the ratio of the ingredients c:b should be from 1:10 to 1:400.

The subject matter of the invention is also a process for manufacturing such polymer dispersions. Another subject matter of the invention is moreover the use of such polymer dispersions as the major ingredient of an aqueous adhesive. A further subject matter of the invention is the use of such dispersions as a coating agent.

The inventive polymer dispersion is an aqueous dispersion. In this context, "dispersion" should also be understood to mean an emulsion, suspension or colloidal solution. In the scope of the invention, it is also possible that the form of the dispersion (oil-in-water, water-in-oil, solution) can change depending on the pH. Furthermore, an inventive dispersion can also optionally comprise pigments or fillers in particulate form.

An aqueous adhesive can be manufactured from an inventive polymer dispersion. Furthermore, the adhesive can comprise typical additives and auxiliaries. They can be incorporated together with the polymer dispersion, however they can also be subsequently blended into the adhesive. The polymer dispersion is not intended to be crosslinked, i.e. does not comprise a crosslinker nor possess permanently self-crosslinking groups in the polymer, which cause the polymer to crosslink during manufacture, storage or application.

The inventive polymer dispersion is manufactured in water by processes known per se by radical polymerization in the presence of at least one protective colloid.

Anionic or non-ionic substances can be employed as the protective colloid for manufacturing the polymer dispersion. Examples of these are natural polymers, such as starch ethers and/or cellulose ethers or their derivatives, e.g. modified by oxidation, esterification, etherification, acidic degradation, especially hydroxyalkyl ether starches, hydroxyalkyl celluloses, carboxyalkyl celluloses, carboxyalkyl ether starches; dextrins or hydroxyalkyl dextrins. They can be used singly or in a mixture.

Likewise suitable are polyvinyl pyrrolidone or polycarboxylic acids, such as poly(meth)acrylic acid, optionally in the form of copolymers, optionally with hydroxy group-carrying esters of (meth)acrylic acid, or polyacrylamide and its derivatives. Furthermore, polyvinyl alcohol, for example with a degree of hydrolysis between 70 to 90 wt. %, can also be present as a protective colloid.

The protective colloids should be anionic or neutral, optionally even after neutralization. These products are commercially available and can be selected according to their properties by a person skilled in the art. They should be comprised in the dispersion as the protective colloid during the polymerization in an amount of 0.2 to 20 wt. %, preferably between 1 to 10 wt. %. According to the invention, the content is preferably kept low. However, if the polymerization is carried out in the presence of pigments, then an increased amount of the protective colloid may be required. Non-ionic protective colloids, especially polyvinyl alcohol, are preferably used as the sole protective colloid.

The inventive polymer dispersion should comprise a copolymer based on monomers reacted by means of radical emulsion polymerization or suspension polymerization. According to the invention, predominantly vinyl esters should be comprised as the monomers, fractions of polymerisable monomers that carry functional groups that can be converted to anionic groups, for example carboxyl groups, fractions of non-polar copolymerizable monomers, such as aromatic monomers or unsaturated carboxylic acid esters, optional fractions of monomers that carry polar groups and minor fractions of polymerisable compounds containing more than one double bond.

Different copolymerizable monomers can be comprised, but neither halogenated monomers should be used nor crosslinkable functional group-containing monomers that could subsequently crosslink with one another in storage or during the application.

The copolymer is synthesized from different copolymerizable monomers. Component a) comprises esters of vinyl alcohol and $C_2$ to $C_6$ monocarboxylic acids, for example vinyl acetate or vinyl hexanoate, especially vinyl acetate, vinyl propionate, vinyl n-butyrate.

Furthermore, component b) comprises at least one polymerizable monomer that comprises acidic groups as the additional functional group. They may be inorganic acidic groups, such as sulfonic acid, phosphoric acid or phosphonic acid groups, or preferably carboxylic groups. Examples of these are vinylphenyl sulfonic acid, vinyl sulfonic acid, vinyl phosphoric acid or vinylphenyl phosphonic acid. In particular, $\alpha,\beta$-unsaturated $C_3$ to $C_9$ mono- or dicarboxylic acids should be comprised, especially $C_3$ to $C_5$. They are particularly preferably acrylic acid, methacrylic acid, itaconic acid, crotonic acid and/or maleic acid, fumaric acid or their half esters with $C_1$ to $C_4$ alcohols. The corresponding carboxylic acid anhydrides can also be employed.

According to the invention, the polymers are weakly crosslinked through the branching units or have a branched structure. These polyfunctional monomers are comprised as a minor fraction as component c). In this case they can be di- or polyfunctional monomers. Exemplary polyunsaturated molecules of this type are diallyl phthalates, diallyl maleate, triallyl cyanurate, tetraallyloxyethane, divinylbenzene, allyl acrylate, allyl methacrylate, vinyl crotonate, butane diol-1,4-di(meth)acrylate, hexane diol-1,6-di(meth)acrylate, triethylene glycol di(meth)acrylate, divinyl adipate or mixtures thereof. They can be employed in addition to the abovementioned monomers in amounts of 0.01 to 5 wt. %, especially 0.05 to 2 wt. %.

These polyfunctional monomers lead to branching or crosslinking within the polymer particle, which has a positive effect on the viscosity behavior when the adhesive is neutralized. In this way a deliberate and controllable viscosity increase can be achieved, which is influenced inter alia by a higher solubility or swellability of the polymer.

Moreover, the inventively suitable copolymer can comprise at least one type of non-polar monomer as the component d), i.e. they should not possess any polar groups. Examples of these are esters of $\alpha,\beta$-ethylenically unsaturated $C_2$ to $C_5$ mono- or dicarboxylic acids with $C_1$ to $C_{12}$ linear or branched alcohols, such as for example the methyl, ethyl, n-butyl, iso-butyl and 2-ethylhexyl esters of acrylic acid and methacrylic acid, the methyl, ethyl and propyl esters of crotonic acid, the dimethyl or di-n-butyl esters of maleic acid and fumaric acid. Esters of (meth)acrylic acid with alcohols having $C_6$ to $C_{12}$ carbon atoms are preferred. Further, vinyl esters of long chain linear or branched monocarboxylic acids can be comprised as the non-polar monomer. Examples of these are vinyl esters of $C_7$ to $C_{18}$ monocarboxylic acids, such as stearic acid, lauric acid or versatic acid.

In addition, minor quantities of functionalized esters can also be present, as long as the functional groups do not react with each another. Here they concern polar groups. Examples of these are amino, hydroxyl, N-methylol groups in the alcohol-substituent, for example hydroxyethyl (meth)acrylate, hydroxypropyl (meth)acrylate, hydroxybutyl (meth)acrylate, (meth)acrylamide, hydroxyethylacrylamide, allyl carbamate, N-methylol (meth)acrylamide, N-methylol allylcarbamate as well as the N-methylol esters, acrylamido methoxyacetic acid methyl ester, N-dimethylaminopropylmethacrylamide, N-methyl (meth)acrylamide, N-butyl (meth)acrylamide, N-cyclohexyl (meth)acrylamide, acrylonitrile and the like. The quantity however, should be less than 10, especially less than 5 wt. %.

The cited vinyl esters a) can each be used alone or as a mixture of two or more of the cited vinyl esters. In the context of a preferred embodiment of the invention, the fraction of such vinyl esters in the total polymer is between 80 and 95 wt. %.

Between 1 up to 20 wt. %, especially between 5 wt. % and 15 wt. %, of the acidic group-containing monomers are used. If insufficient amounts of monomers that can be converted into anionic groups are used, then a subsequent detachability is diminished.

The quantity of the hydrophobic, non-polar monomers of the invention is chosen such that up to 15 wt. % of hydrophobic monomers, especially between 1.0 wt. % and 10 wt. %, are used. If no hydrophobic monomers were used, then the adhesion to the non-polar substrates would be worse. The monomers can be distributed statistically over the molecular chain or they can form blocks.

According to the invention, it is necessary that the ratio of the di- or polyunsaturated monomers (c) to the ratio of the acidic group-containing unsaturated monomers (b) should be from 1:10 to 1:400. In particular, the ratio should be from 1:30 to 1:300. If the amount of the polyunsaturated monomers is too high, then a storage-stable polymer dispersion will not be obtained. In addition, the viscosity characteristics will not be adequate, the viscosity generally being too low. If the amount of the polyunsaturated monomers is too low, then the viscosity behavior in the required pH range is unsuitable. Based on the polymerizable monomers, 0.05 mol. % to 1.5 mol. % of preferably difunctional monomers should be employed. The amount of the groups that can be converted to ionic groups, in particular to carboxyl groups, also influences the viscosity. If the amount of the acidic groups is too low, then the polymer will not go into aqueous solution. If the amount of the carboxylic acid is too high, then the pH for suitable viscosity is too high.

The rheological properties of the neutralized adhesive can be influenced by the addition of these monomers. In this way, especially the shear behavior can be improved for the application.

The inventively used polymer dispersions can be manufactured by known emulsion or suspension polymerization methods. Suitable processes for emulsion polymerization are described, for example, in "Comprehensive Polymer Chemistry", 4, 171-218. For example, an aqueous solution of at least one surfactant/emulsifier is initially manufactured. Then, one or more protective colloids such as starch ethers and/or cellulose ethers or their derivatives are added to this solution. This solution or dispersion is then homogenized, optionally also facilitated by heating. The monomer mixture is then added pro rata and homogenized, then the polymerization is initiated by adding typical initiator components, optional monomer is subsequently added, and the reaction is taken to completion at increased temperature. Still further additives can be optionally added, for example defoamers, neutralizers, stabilizers.

The known water-soluble or oil-soluble polymerization initiators can be used as the polymerization initiators. Peroxide compounds, such as tert.-butyl hydroperoxide, $NH_4$-, Na- or K-peroxydisulfate, peroxydisulfuric acid, cumene hydroperoxide or benzoyl peroxide; azo compounds, such as diazo isobutyrodinitrile, azo bis(amidinopropyl) dihydrochloride; or redox initiators, such as peroxysulfates/metabisulfates, peroxysulfates/thiosulfates or peroxides/thiosulfates are particularly suitable. In the context of the present invention, the quantity of added polymerization initiator is generally about 0.01 to about 2.0 wt. %, especially between 0.1 to 1.5 wt. %. In one embodiment, in order to obtain a complete reaction and to reduce the content of residual monomer, an or also an optionally different initiator can be additionally added at the end of the reaction and a post reaction can be carried out at a higher temperature.

The solids content of the polymer dispersion can vary over a wide range in the manufacturing process and can be, for example 25 to 75 wt. %, especially 45 to 65 wt. %. A solids content in the range 50 to 60 wt. % is particularly suitable. These dispersions are preferably free of organic solvents, i.e. contents of below 0.5 wt. %.

The pH of the inventive polymer dispersion should be between 5.5 and 9.0. In this regard, if the pH is adjusted by the addition of neutralizers, then a change in the form of the polymer can occur, for example the polymer of the dispersion form can convert into a soluble form. The viscosity of the polymer dispersion at a temperature of 20 to 40° C. should be between 30 000 to 100 000 mPas, especially from 40 000 to 70 000 mPas (Brookfield RVT, spindle 27, DIN ISO 2555). These dispersions are stable and storage-stable.

Additional additives can be added to the polymer dispersion after cooling or when warm. In another embodiment, an inventive adhesive in the form of a dispersion is manufactured from this polymer dispersion. Additional additives can also be added during the manufacture of the adhesive. The inventive aqueous adhesive should comprise between 40 and 80 wt. % of the inventive polymer dispersion.

In one embodiment of the invention, the adhesive comprises, based on the total adhesive dispersion, up to about 40 wt. % of additives or auxiliaries. The additives or auxiliaries include for example, wetting agents, defoamers, stabilizers, antioxidants, photostabilizers, biocides, pH adjustors, colorants and the like. In a further preferred embodiment, pigments/fillers can also be comprised.

The inventive adhesive can comprise at least one surface active agent. These substances are understood to be those that reduce the interfacial tension to water, such as defoamers, surfactants, wetting agents. They can be additionally comprised in the abovementioned protective colloids. Such materials generally comprise hydrophilic and hydrophobic groups. Part of the surface active agents can be added prior to the polymerization or are then incorporated into the adhesive dispersion. They provide wetting, avoid foaming as well as stabilizing the fractions of monomers, polymers or additives, optionally also pigments or fillers that by themselves are water-insoluble. Anionic, non-ionic, ampholytic surfactants or their mixtures can be comprised.

Exemplary suitable anionic surfactants are alkyl sulfates, alkyl, alkylaryl ether sulfates, such as alkylphenol ether sulfates; sulfonates, especially fatty alcohol sulfonates, alkyl sulfonates, alkylaryl sulfonates; esters and half esters of sulfosuccinic acid which can be optionally ethoxylated; alkali metal and ammonium salts of carboxylic acids, for example of fatty acids; partial esters of phosphoric acid and their alkali metal and ammonium salts.

Exemplary ampholytic surfactants are long chain substituted amino acids such as N-alkyl-di(aminoethyl)glycine or N-alkyl-2-amino propionic acid salts, betaines, such as N-(3-acylamidopropyl)-N,N-dimethylammonium salts or alkylimidazolium betaines.

Exemplary non-ionic surfactants are alkyl polyglycol ethers, alkylaryl polyglycol ethers, fatty alcohol polyglycol ethers; ethylene oxide/propylene oxide (EO/PO) block copolymers, fatty alcohol EO/PO-adducts and alkylphenol EO/PO adducts, preferably those with about 8 to about 50 EO or PO units; addition products of alkylamines, fatty and resin acids, alkyl polyglycosides containing linear or branched, saturated or unsaturated alkyl groups with on average 8 to about 24 carbon atoms and an oligoglycoside group; natural products and their derivatives such as lecithin, lanolin or sarcosine; linear organo(poly)siloxanes containing polar groups, in particular those with alkoxy groups with up to 10 carbon atoms and up to about 30 EO or PO groups.

In a preferred embodiment of the invention, the adhesive dispersion comprises at least one anionic or one non-ionic surfactant. The inventive adhesive dispersion can comprise such surface active substances in an amount of 0.1 to about 5.0 wt. %, for example 0.2 to 2.5 wt. %, based on the total adhesive dispersion.

Benzoates, fluorides such as sodium fluoride, amidic substances and hydroxybenzoic acid esters can be advantageously added as preservatives in amounts of 0.2 to 1 wt. %. The inventive adhesive dispersion can comprise up to 2 wt. %, preferably 0.1 to 1 wt. % of UV stabilizers as further additives. The so-called HALS compounds are particularly preferred as the UV stabilizers. Viscosity regulators, such as polyacrylic acids, urea, thiourea and/or dicyandiamide should preferably not be present in the inventive adhesive.

The inventive adhesives can also comprise other common additives used in label adhesives. Thus, to strengthen the wet adhesion strength for example, polysaccharides such as natural starches, degraded starches, chemically modified starches, dextrins can be added, the molecular weight being higher than for chemically similar ingredients present as the protective colloid.

The inventive adhesive dispersion can also comprise fractions of plasticizers or tackifying resins, for example. Exemplary suitable plasticizers are esters, such as abietic acid esters, adipic acid esters, azelaic acid esters, esters of fatty acids that carry OH groups or of epoxidized fatty acids, glycolic acid esters, phosphoric acid esters, phthalic acid esters, sebacic acid esters, sulfonic acid esters, trimellitic acid esters, citric acid esters, as well as mixtures thereof. Exemplary suitable tackifying resins are hydrocarbon resins, such as terpene resins, coumarone/indene resins; aliphatic petrochemical resins; hydrocarbon resins based on unsaturated CH compounds or modified phenolic resins or colophonium resins and their derivatives. The amounts, based on the total adhesive, should be less than 10 wt. %.

In one embodiment, the inventive adhesive can also comprise pigments and/or fillers. These can be blended into the adhesive dispersion at a later stage, or preferably the polymerization takes place in the presence of the fillers. Particularly suitable organic or inorganic fillers have a particle size of about 0.05 to about 10 µm, for example 0.1 to 5 µm, or 0.2 to 4 µm. Fillers are also understood to include pigments, in so far as these are insoluble in the aqueous phase.

In the context of the present invention, exemplary suitable pigments/fillers are inorganic substances that are inert under the storage conditions. Exemplary suitable inorganic materials are layer silicates such as aluminum silicates, sodium-aluminum or calcium silicates, silicon dioxide, minerals, such as diatomaceous earth, quartz powder, silica gel, barium sulfate, metal oxides such as zinc oxide, titanium dioxide, zeolites, potash feldspar, biotite, the group of poorly soluble sulfates, such as gypsum, anhydrite or barites, and calcium minerals, such as talc or chalk. In the context of the present invention, the inorganic materials mentioned may be used individually, i.e. as the sole type of filler particles. However, a mixture of two or more of the mentioned filler particles may equally well be used.

The quantity of fillers in the inventive adhesive dispersion should be 0 to 90 wt. %, preferably 10 to 70 wt. %, based on the polymer fraction. In this regard, the filler can also optionally be blended in during the manufacture of the polydispersion.

The inventive adhesives are manufactured by mixing the components in a manner known per se. It is advisable here to first of all manufacture a polymer dispersion. The viscosity and dissolution behavior of the dispersion can then be adjusted by neutralization of the anionic groups. The solubility of the inventively added polymers is dependent on the pH, i.e. for pH values in the acidic region, in which the acidic groups are either not present or only present in a very low fraction as ions, the copolymer is only slightly soluble or insoluble. Only by neutralizing at least a part of the acidic groups will the substances become hydrophilic enough for them to go into solution. This can already occur in the neutral pH region or also in the weakly acidic region, for example pH 6.

The neutralization can be partially carried out with a non-volatile base, for example an alkali metal hydroxide or a non-volatile amine, for example triethanolamine. However, the neutralizing agent should preferably consist of at least 75% of a volatile base, for example ammonia or a volatile amine, especially more than 95%. This is particularly advisable if the glued surface is intended to have an improved water resistance after storage.

The pH of the aqueous adhesive dispersions is preferably in the range 5.5 to 9.5, particularly 6.0 to 9.0. The viscosity of the finished adhesive is usually in the range of 10 000 to 200 000 mPas, in particular in the range of about 20 000 to 100 000 mPas at 25° C.

As adhesives of this type are often applied using high-speed machines, it is advisable that the adhesives exhibit a non-Newtonian viscosity behavior. They should be shear thinning. The inventively suitable adhesive dispersions are stable against shear forces. The change in viscosity is only small, even for extended recirculation during the application. The shear thinning behavior is also retained.

The inventively advantageous viscosity is also dependent on the pH of the corresponding adhesive dispersion. If the chosen pH is too alkaline, then the corresponding suitable viscosity will no longer be achieved. Such dispersions are not suitable for use as a label adhesive. Accordingly, it is inventively particularly advantageous for the adhesive dispersion if the viscosity can be influenced reversibly as a function of the pH of the adhesive dispersion.

The inventive adhesive dispersions are suitable for gluing similar or different substances. Substrates with smooth surfaces as well as substrates with rough or porous surfaces can be coated or glued, for example absorbent substrates, such as paper or cardboard, but in particular non-absorbent surfaces can be glued. A substrate preferably consists of a water-permeable material. Labels, for example, especially paper labels, are suitable flexible substrates. Glass or plastic surfaces are especially suitable as hard surfaces or as molded objects. Good adhesion can be achieved with the inventive aqueous adhesive on PU-coated glass, polystyrene, polycarbonate, polyvinyl chloride, polyethylene terephthalate, for example. The inventive adhesive is also suitable, however for other plastics, e.g. for polyethylene or polypropylene.

Accordingly, the subject matter of the present invention is also the use of the inventive polymer dispersions in label adhesives. For this, the inventive adhesive is deposited on the flat substrate to be glued, e.g. a label. The bond quickly shows a good adhesive strength. For less porous or hydrophilic substrates, e.g. plastic labels, the drying process takes longer. This can be optionally facilitated by increased temperatures. After drying, the adhesive bond is water resistant, i.e. the label is not detached from the substrate under conditions of damp surroundings, e.g. high air humidity, dew, rain.

The adhesive dispersion is usually applied onto the substrate by means of high-speed rollers. For this, the adhesive dispersion is brought into a storage reservoir and from there is applied by known application rollers, wiper units etc. onto the press cylinder, which transfers the adhesive onto the substrate to be coated. In order to ensure the homogeneity of the composition, the adhesive mixture is mixed with the excess portions wiped off the rollers and recirculated. A shear thinning liquid with an inventively adjusted viscosity for the application temperature is particularly advantageous for the production of a suitable coating layer. The inventive adhesive dispersion shows excellent stability on recirculation. The viscosity and the shear thinning behavior are retained even for extended periods.

For the subsequent recycling of objects, the object is again subjected to an alkaline wash, e.g. at a pH>9, in particular at temperatures of 40 to 80° C., the adhesive with the label can be again detached and thus separated from the substrate.

According to another embodiment of the invention, remoistenable adhesives can be manufactured from the inventive polymer dispersions. An adhesive is produced from the polymer dispersion by adding suitable additives. This adhesive can be applied in a thin layer onto a flat substrate, for example a paper substrate. A non-sticky, non-blocking adhesive layer is obtained after drying. When the adhesive layer is remoistened, it again develops an adhesive strength and thus can be glued to other substrate surfaces.

In another embodiment of the present invention, the inventive polymer dispersion is used for manufacturing coatings that can be washed off. For this, additional auxiliaries, for example colorants or UV stabilizers, can be blended with the polymer dispersion. After adjustment to a suitable viscosity, the coating agent can be applied onto a surface. The water of the dispersion can evaporate, subsequently producing a coating. This coating can once again be detached by washing, for example with water or slightly alkaline solutions. It can therefore be used, for example as a coating for the transport of objects.

The inventive dispersion exhibits a good adhesion to the various smooth substrates and is again easily removed from the substrate by alkaline wash solutions. The adhesive dispersion is stable under the processing conditions and retains the required shear thinning behavior even after extended recirculation in the application equipment.

The invention is illustrated below in more detail by means of the examples.

EXAMPLE 1

Comparative

A pre-emulsion (A) was prepared in a high-speed stirrer from:
240 g distilled water
26 g polyvinyl alcohol (Mowiol 4-88)
4 g $Na_2S_2O_5$
62 g of an emulsifier (4:1 Disponil FES 77/Disponil A 3065)
510 g vinyl acetate
57 g crotonic acid
5 g TBHP (tert.-butyl hydroperoxide)
50 g distilled water An initiator solution (B) was manufactured from 100 g water and 6 g $K_2S_2O_5$. An initiator solution (C) was prepared from 10 g dist. water and 3 g TBHP.

In a reactor were mixed 440 g distilled water, 2.5 g $NaHCO_3$ and 3.0 g $K_2S_2O_8$. 100 g pre-emulsion (A) were mixed into the reactor and the remaining amount of the pre-emulsion (A) and the initiator solution (B) were metered in with stirring at 90° C. within 5 hours. After a further hour a mixture (C) was slowly added to the emulsion and stirred for 1 hour at about 90° C. 10 g of distilled water together with 1 g ascorbic acid were then added and stirred for one hour. After cooling, the deposit was filtered. Solids 36.5% 1275 g of aqueous sodium hydroxide (19 g NaOH) were added to the solution and homogenized. The dispersion had a solids content of 29.3% and a pH of 6.3.

EXAMPLE 2

A pre-emulsion (A) was prepared by means of a high-speed stirrer from:
240 g distilled water
26 g polyvinyl alcohol
4 g $Na_2S_2O_5$
62 g of an emulsifier (Disponiel FES 77)
492 g vinyl acetate
30 g TPGDA (difunctional monomer)
57 g crotonic acid
5 g TBHP (tert.-butyl hydroperoxide)
50 g distilled water In a reactor were mixed 440 g distilled water, 2.5 g $NaHCO_3$ and 3.0 g $K_2S_2O_8$. 100 g pre-emulsion (2A) were mixed into the reactor and the remaining amount of the pre-emulsion, together with the initiator solution (1B) were metered in with stirring at 90° C. within 5 hours. After a further hour solution (1C) was slowly added to the emulsion and stirred for 1 hour at about 90° C. 10 g of distilled water together with 1 g ascorbic acid were then added and stirred for one hour. After cooling, the deposit was filtered. Solids 33.5% 1275 g of aqueous sodium hydroxide (19 g NaOH) were added to the solution and homogenized. The dispersion had a solids content of 33.5% and a pH of 6.4.

EXAMPLE 3

A pre-emulsion (A) was prepared from:
240 g distilled water
26 g of a polyvinyl alcohol
4 g $Na_2S_2O_5$
62 g of an emulsifier (Disponiel FES 77/Disponil A 3065)
500 g vinyl acetate
15 g TPGDA (difunctional monomer)
57 g crotonic acid
5 g TBHP In a reactor were mixed 430 g distilled water, 2.5 g $NaHCO_3$ and 6.0 g $K_2S_2O_8$. 100 g pre-emulsion (3A) were placed into the reactor and the remaining amount of the pre-emulsion and the initiator solution (1B) were metered in with stirring at 90° C. within 4 hours. After a further hour mixture (1C) was slowly added to the emulsion and stirred for 1 hour at about 90° C. 10 g of distilled water together with 1 g ascorbic acid were then added and stirred for one hour. After cooling, the deposit was filtered. Solids 33.5% 1275 g of aqueous sodium hydroxide (19 g NaOH) were added to the solution and homogenized. The dispersion had a solids content of 29.3% and a pH of 6.3.

Application Tests:

Test 4: 5 g of a water-soluble starch (Merigel 100) were added to 250 g of a dispersion of test 2.

A beech wood test specimen was coated with the solution with a ca. 0.5 mm layer thickness. A second test specimen was then immediately adjoined and compressed for one hour. There resulted a solid adhesive bond.

Test 5: 20 g of a water-soluble polyvinyl alcohol (EV 0498) were added to 250 g of a dispersion of test 2 and blended. A coating was applied with a doctor blade onto a metal plate and dried for 24 hours (layer thickness 400 µm). After a further two days the coating could be again washed off with water with slight rubbing. The coating disintegrated.

Test 6: 5 g of a water-soluble starch were added to 250 g of a dispersion of test 3.

A paper label was coated with ca. 200 µm and then immediately glued onto a glass bottle. A solidly glued label was obtained after drying. The label could be detached again from the substrate by washing with 1.5% NaOH at a temperature of 75° C.

We claim:

1. An aqueous adhesive comprising an aqueous polymer dispersion that comprises a copolymer wherein the copolymer comprises monomer components of:
    a) 80 to 95 wt. % of vinyl acetate, vinyl propionate, vinyl butyrate or mixtures thereof;
    b) 1 to 20 wt. % of acrylic acid, methacrylic acid, crotonic acid, itaconic acid, half ester of itaconic acid, maleic acid, half ester of maleic acid, fumaric acid, half esters of fumaric acid or mixtures thereof;
    c) 0.01 to 5 wt. % of diallyl, divinyl, di(meth)acrylic or tri or tetraunsaturated compounds;
    d) up to 20 wt. % of α,β-unsaturated esters of $C_2$ to $C_4$ mono- or dicarboxylic acids with branched, linear or cyclic $C_2$ to $C_{12}$ alkanols; and
    e) up to 10 wt. % of copolymerizable monomers that carry polar functional groups;
    wherein the sum of the components is 100 wt. % and the wt. % ratio of the components c:b is from 1:10 to 1:400.

2. The aqueous adhesive according to claim 1 wherein the wt. % ratio of the components c:b is from 1:30 to 1:300.

3. The aqueous adhesive according to claim 1 wherein the copolymer comprises from 5 to 15 wt. % of the component b and from 0.05 to 2 wt. % of the component c.

4. The aqueous adhesive according to one of claim 1 wherein the component c comprises from 0.05 to 1.5 mol. % of a di-unsaturated monomers.

5. The aqueous adhesive according to claim 1 wherein the viscosity of the dispersion ranges from 30 000 mPas to 100 000 mPas at 20 to 40° C.

6. The aqueous adhesive according to claim 5 wherein the pH ranges from 6.0 to 9.0, and the pH is adjusted by a volatile base.

7. The aqueous adhesive according to claim 1 wherein the adhesive exhibits a shear thinning behavior at pH range of 5.5 to 9.5.

8. An aqueous adhesive comprising an aqueous polymer dispersion of a copolymer, which comprises monomer components of
- a) 80 to 95 wt. % esters of vinyl alcohol with $C_2$ to $C_6$ monocarboxlic acids;
- b) 1 to 20 wt. % of $\alpha,\beta$-unsaturated $C_3$ to $C_9$ carboxylic acids or vinyl-substituted phosphonic or sulfonic acids;
- c) 0.01 to 5 wt. % of polyunsaturated monomers;
- d) up to 20 wt. % of non-polar, copolymerizable monomers;
- e) up to 10 wt. % of copolymerizable monomers that carry polar functional groups;
- f) an additive; and
- g) an auxiliary;

wherein the sum of the components is 100 wt. % and the ratio of the components c:b is from 1:10 to 1:400; and wherein the adhesive is essentially free of a thickener.

9. The aqueous adhesive according to claim 8 further comprising fillers, emulsifiers, preservatives, viscosity regulators and/or natural polymers.

10. The aqueous adhesive according to claim 8 which is dried to a non-blocking adhesive, wherein the non-blocking adhesive is remoistenable with water, or soluble or dispersible in an alkaline solution.

11. An article of manufacture comprising the aqueous adhesive of claim 1.

12. The article of claim 11 wherein the adhesive is a wood adhesive, remoistenable adhesive, label adhesive or bottle adhesive.

13. The article of claim 12 wherein the adhesive is removeable or dispersible with an alkaline solution at a temperature range of 40 to 80° C.

14. The article of claim 11 further comprising a substrate.

15. The article of claim 14 wherein the substrate is wood, paper, cardboard, glass, plastic or molded object.

* * * * *